(12) United States Patent
Lim et al.

(10) Patent No.: US 11,855,716 B2
(45) Date of Patent: Dec. 26, 2023

(54) APPARATUS FOR TRANSMITTING BROADCAST SIGNAL FOR SIGNALING INFORMATION ABOUT COMBINATION OF LDM AND MIMO AND METHOD USING THE SAME

(71) Applicant: ELECTRONICS AND TELECOMMUNICATIONS RESEARCH INSTITUTE, Daejeon (KR)

(72) Inventors: Bo-Mi Lim, Daejeon (KR); Hoi-Yoon Jung, Daejeon (KR); Sung-Ik Park, Daejeon (KR); Hae-Chan Kwon, Daejeon (KR); Sung-Jun Ahn, Daejeon (KR); Nam-Ho Hur, Daejeon (KR); Hyun-Jeong Yim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/859,969

(22) Filed: Jul. 7, 2022

(65) Prior Publication Data
US 2023/0155634 A1     May 18, 2023

(30) Foreign Application Priority Data
Nov. 18, 2021   (KR) .................. 10-2021-0159000

(51) Int. Cl.
H04B 7/0413     (2017.01)
H04L 1/00       (2006.01)
H04W 4/06       (2009.01)

(52) U.S. Cl.
CPC ......... *H04B 7/0413* (2013.01); *H04L 1/0071* (2013.01); *H04W 4/06* (2013.01)

(58) Field of Classification Search
CPC ....... H04B 7/0413; H04L 1/0071; H04W 4/06
See application file for complete search history.

(56) References Cited

U.S. PATENT DOCUMENTS 10,454,536 B2   10/2019   Park et al.
10,708,106 B2    7/2020   Kim et al.
(Continued)

FOREIGN PATENT DOCUMENTS

KR        10-1223605 B1      1/2013
KR    10-2018-0132525 A     12/2018
(Continued)

OTHER PUBLICATIONS

Advanced Television Systems Committee, "ATSC Standard: Physical Layer Protocol", A/322, Jan. 20, 2021.

*Primary Examiner* — Rahel Guarino

(57) ABSTRACT

Disclosed herein are a method for transmitting a broadcast signal for signaling information about a combination of Layered-Division Multiplexing (LDM) technology and Multiple-Input Multiple-Output (MIMO) technology and an apparatus using the method. The method includes generating first signaling information indicating whether MIMO technology is applied to an enhanced layer by LDM technology, generating second signaling information indicating an MIMO application method when the MIMO technology is applied to the enhanced layer, and generating a broadcast signal using the first signaling information and the second signaling information.

17 Claims, 10 Drawing Sheets

(56) References Cited

U.S. PATENT DOCUMENTS

| | | |
|---|---|---|
| 11,356,214 B2 | 6/2022 | Lee |
| 2013/0195158 A1 | 8/2013 | Bae |
| 2018/0351609 A1 | 12/2018 | Park |
| 2019/0305886 A1* | 10/2019 | Baek .................... H04L 1/0059 |

FOREIGN PATENT DOCUMENTS

| | | |
|---|---|---|
| KR | 10-2019-0053791 A | 5/2019 |
| KR | 10-2019-0122842 A | 10/2019 |

* cited by examiner

| VALUE | OPTION |
|---|---|
| 0 | MIMO IS NOT USED IN THE GIVEN ENHANCED LAYER OF THE FIRST SUBFRAME |
| 1 | MIMO IS USED IN THE GIVEN ENHANCED LAYER OF THE FIRST SUBFRAME |

FIG. 7

| VALUE | OPTION |
|---|---|
| 0 | MIMO IS NOT USED IN THE GIVEN ENHANCED LAYER OF THE CURRENT SUBFRAME |
| 1 | MIMO IS USED IN THE GIVEN ENHANCED LAYER OF THE CURRENT SUBFRAME |

FIG. 8

| VALUE | OPTION |
|---|---|
| 0 | STREAM COMBINING OF MIMO ENCODING IS NOT USED IN THE GIVE ENHANCED LAYER PLP OF THE FIRST OR CURRENT SUBFRAME |
| 1 | STREAM COMBINING OF MIMO ENCODING IS USED IN THE GIVE ENHANCED LAYER PLP OF THE FIRST OR CURRENT SUBFRAME |

FIG. 10

| VALUE | OPTION |
|---|---|
| 0 | I-Q POLARIZATION INTERLEAVING OF MIMO ENCODING IS NOT USED IN THE GIVEN ENHANCED LAYER OF THE FIRST OR CURRENT SUBFRAME |
| 1 | I-Q POLARIZATION INTERLEAVING OF MIMO ENCODING IS USED IN THE GIVEN ENHANCED LAYER OF THE FIRST OR CURRENT SUBFRAME |

FIG. 11

| VALUE | OPTION |
|---|---|
| 0 | PHASE HOPPING OF MIMO ENCODING IS NOT USED IN THE GIVEN ENHANCED LAYER PLP OF THE FIRST OR CURRENT SUBFRAME |
| 1 | PHASE HOPPING OF MIMO ENCODING IS USED IN THE GIVEN ENHANCED LAYER PLP OF THE FIRST OR CURRENT SUBFRAME |

FIG. 12

| VALUE | OPTION |
|---|---|
| 0 | MIMO IS NOT USED IN THE GIVEN ENHANCED LAYER OF FIRST OR CURRENT SUBFRAME |
| 1 | MIMO IS USED IN THE GIVEN ENHANCED LAYER OF FIRST OR CURRENT SUBFRAME |

FIG. 13

| VALUE | OPTION |
|---|---|
| 0 | MIMO IS NOT USED IN THE FIRST OR CURRENT SUBFRAME WHICH INCLUDES AT LEAST ONE ENHANCED LAYER PLP |
| 1 | MIMO IS USED IN THE FIRST OR CURRENT SUBFRAME WHICH INCLUDES AT LEAST ONE ENHANCED LAYER PLP |

APPARATUS FOR TRANSMITTING BROADCAST SIGNAL FOR SIGNALING INFORMATION ABOUT COMBINATION OF LDM AND MIMO AND METHOD USING THE SAME

CROSS REFERENCE TO RELATED APPLICATION

This application claims the benefit of Korean Patent Application No. 10-2021-0159000, filed Nov. 18, 2021, which is hereby incorporated by reference in its entirety into this application.

BACKGROUND OF THE INVENTION

1. Technical Field

The present invention relates generally to technology for transmitting/receiving a broadcast signal, and more particularly to technology for transmitting/receiving a broadcast signal to which a combination of Multiple-Input Multiple-Output (MIMO) technology and Layered-Division Multiplexing (LDM) technology is applied.

2. Description of the Related Art

Terrestrial broadcast systems based on ATSC 3.0 standards include Multiple-Input Multiple-Output (MIMO) technology and Layered-Division Multiplexing (LDM) technology. Also, although not included in the current terrestrial broadcast systems, a combination of the two technologies may further improve transmission efficiency.

In a method of combining the two technologies in consideration of compatibility with an existing transmitter, a core layer signal is transmitted in the same manner as in the existing method and MIMO technology is applied only to an enhanced layer signal before transmission thereof. However, the existing transmission signaling has a problem in that it cannot describe a combination of MIMO technology and LDM technology.

Accordingly, in order to enable an existing receiver to receive a core layer signal and enable a receiver to which the combined technology is applied to operate normally, it is necessary to design transmission signaling so as to transfer new information without affecting the existing method.

Documents of Related Art (Patent Document 1) Korean Patent No. 10-1223605, published on Jan. 21, 2013 and titled "MIMO communication system and method, transmitter and transmitting method, and receiver and receiving method".

SUMMARY OF THE INVENTION

An object of the present invention is to improve the performance of a broadcast system to which MIMO technology and LDM technology are applied.

Another object of the present invention is to efficiently improve the performance of a broadcast system and provide various services when a signal, in which MIMO technology and LDM technology are combined, and signaling information for accessing the signal are transmitted.

A further object of the present invention is to provide a broadcast service, to which a combination of MIMO technology and LDM technology is applied, while maintaining compatibility with existing receivers.

Yet another object of the present invention is to enable an existing terminal, to which combined technology is not applied, to receive a terrestrial broadcast signal including a core layer signal and to acquire transmission information in the same manner as before.

In order to accomplish the above objects, a method for transmitting a broadcast signal according to the present invention includes generating first signaling information indicating whether Multiple-Input Multiple-Output (MIMO) technology is applied to an enhanced layer by Layered-Division Multiplexing (LDM) technology; generating second signaling information indicating an MIMO application method when the MIMO technology is applied to the enhanced layer; and generating a broadcast signal using the first signaling information and the second signaling information.

Here, the first signaling information for the first subframe of the broadcast signal may be included in L1-Basic signaling of the preamble of the broadcast signal, and the first signaling information for a current subframe subsequent to the first subframe in the broadcast signal may be included in L1-Detail signaling of the preamble.

Here, the second signaling information may be included in the L1-Detail signaling.

Here, the second signaling information may include information about whether a stream-combining technique is applied to a physical layer pipe (PLP) corresponding to the enhanced layer, whether an IQ polarization interleaving technique is applied to the physical layer pipe, and whether a phase-hopping technique is applied to the physical layer pipe.

Here, the first signaling information may be generated for each subframe of the broadcast signal, and the second signaling information may be generated for each physical layer pipe (PLP) corresponding to the enhanced layer.

Here, upon receiving the broadcast signal, a first receiver, which supports only the LDM technology, may reconstruct only a signal transferred through a core layer and process a signal transferred through the enhanced layer as a noise signal.

Here, a second receiver, which supports both the LDM technology and the MIMO technology, may reconstruct not only the signal transferred through the core layer but also the signal transferred through the enhanced layer based on the first signaling information and the second signaling information.

Also, a method for transmitting a broadcast signal according to another embodiment of the present invention includes generating first signaling information indicating whether Multiple-Input Multiple-Output (MIMO) technology is applied to an enhanced layer by Layered-Division Multiplexing (LDM) technology; generating second signaling information indicating an MIMO application method when the MIMO technology is applied to the enhanced layer; and generating a broadcast signal using the first signaling information and the second signaling information. The first signaling information may be included in L1-Detail signaling of the preamble of the broadcast signal.

Here, the first signaling information may be generated for each subframe of the broadcast signal, and the second signaling information may be generated for each physical layer pipe (PLP) corresponding to the enhanced layer.

Here, the first signaling information and the second signaling information may be generated only for a subframe to which the LDM technology is applied, among all subframes of the broadcast signal.

Also, an apparatus for transmitting a broadcast signal according to an embodiment of the present invention includes a first signaling information generation unit for generating first signaling information indicating whether Multiple-Input Multiple-Output (MIMO) technology is applied to an enhanced layer by Layered-Division Multiplexing (LDM) technology; a second signaling information generation unit for generating second signaling information indicating an MIMO application method when the MIMO technology is applied to the enhanced layer; and a broadcast signal generation unit for generating a broadcast signal using the first signaling information and the second signaling information.

Here, the first signaling information for the first subframe of the broadcast signal may be included in L1-Basic signaling of the preamble of the broadcast signal, and the first signaling information for a current subframe subsequent to the first subframe in the broadcast signal may be included in L1-Detail signaling of the preamble.

Here, the second signaling information may be included in the L1-Detail signaling.

Here, the second signaling information may include information about whether a stream-combining technique is applied to a physical layer pipe (PLP) corresponding to the enhanced layer, whether an IQ polarization interleaving technique is applied to the physical layer pipe, and whether a phase-hopping technique is applied to the physical layer pipe.

Here, the first signaling information may be generated for each subframe of the broadcast signal, and the second signaling information may be generated for each physical layer pipe (PLP) corresponding to the enhanced layer.

Here, upon receiving the broadcast signal, a first receiver, which supports only the LDM technology, may reconstruct only a signal transferred through a core layer and process a signal transferred through the enhanced layer as a noise signal.

Here, a second receiver, which supports both the LDM technology and the MIMO technology, may reconstruct not only the signal transferred through the core layer but also the signal transferred through the enhanced layer based on the first signaling information and the second signaling information.

Also, an apparatus for transmitting a broadcast signal according to another embodiment of the present invention includes a first signaling information generation unit for generating first signaling information indicating whether Multiple-Input Multiple-Output (MIMO) technology is applied to an enhanced layer by Layered-Division Multiplexing (LDM) technology; a second signaling information generation unit for generating second signaling information indicating an MIMO application method when the MIMO technology is applied to the enhanced layer; and a broadcast signal generation unit for generating a broadcast signal using the first signaling information and the second signaling information. The first signaling information may be included in L1-Detail signaling of the preamble of the broadcast signal.

Here, the first signaling information may be generated for each subframe of the broadcast signal, and the second signaling information may be generated for each physical layer pipe (PLP) corresponding to the enhanced layer.

Here, the first signaling information and the second signaling information may be generated only for a subframe to which the LDM technology is applied, among all subframes of the broadcast signal.

BRIEF DESCRIPTION OF THE DRAWINGS

The above and other objects, features, and advantages of the present invention will be more clearly understood from the following detailed description taken in conjunction with the accompanying drawings, in which:

FIG. 7 is a view illustrating an example of a definition of signaling indicating whether a combination of MIMO and LDM is applied to a first subframe according to the present invention;

FIG. 8 is a view illustrating an example of a definition of signaling indicating whether a combination of MIMO and LDM is applied to a current subframe subsequent to a first subframe according to the present invention;

FIGS. 10 to 12 are views illustrating an example of a definition of signaling indicating which technique of MIMO is applied to the physical layer pipe of an enhanced layer according to the present invention;

FIG. 13 is a view illustrating an example of a definition of signaling indicating whether a combination of MIMO and LDM is applied to a current subframe including a first subframe using only L1-Detail signaling according to the present invention;

DESCRIPTION OF THE PREFERRED EMBODIMENTS

Figure 1:
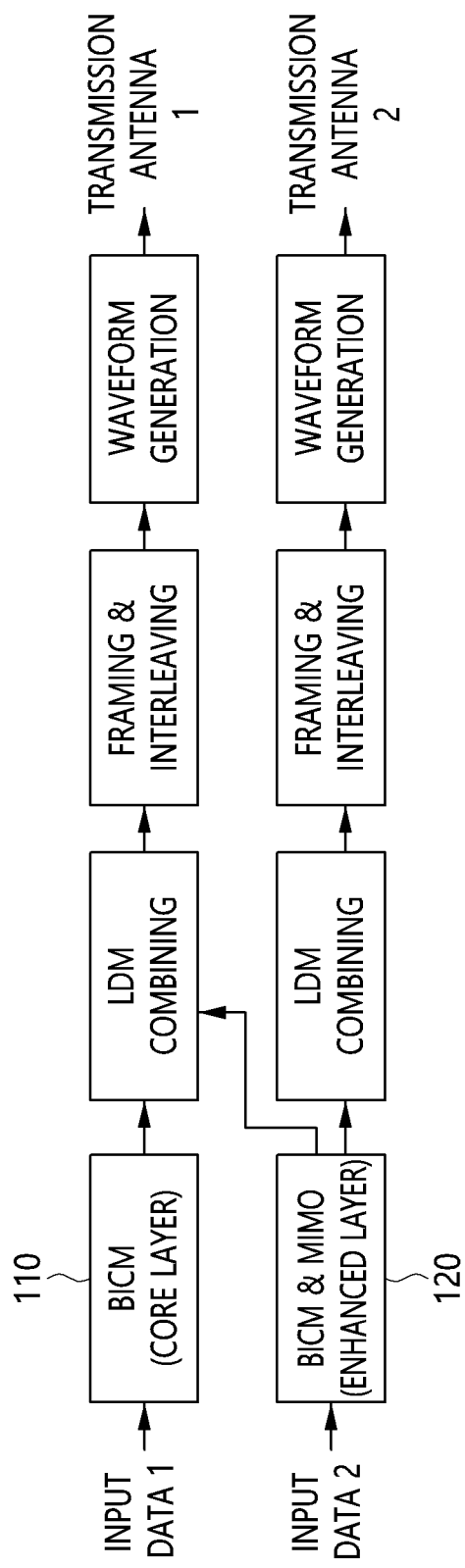
FIG. 1 and FIG. 2 are views illustrating an example of a system in which MIMO and LDM are combined.

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

Terrestrial broadcasting has adopted Multiple-Input Multiple-Output (MIMO) in order to considerably increase transmission capacity compared to a Single-Input Single-Output (SISO) system without adding frequency resources. Currently, terrestrial broadcasting including ATSC 3.0 employs MIMO technology, which uses two antennas for each of transmission and reception. MIMO technology may be considered the addition of different transmission media in a space by adding transmission and reception antennas, and an increased amount of data can be transferred by the increased number of antennas, whereby transmission efficiency may be improved. Also, transmission quality may be improved through diversity gain, which can be obtained by transferring the same data through different paths. Accordingly, the use of MIMO may almost double a transmission rate when compared with existing SISO for the same bandwidth, and may enable a 8K-UHD (Ultra-High Definition) broadcast service as well as a 4K-UHD broadcast service.

Also, terrestrial broadcasting has adopted transmission (physical-layer) signal multiplexing technology, which enables two or more broadcast services transmitted over a single broadcast channel to have different broadcast service coverage areas and to be received in different environments. Typically used multiplexing technology includes Time-Division Multiplexing (TDM) and Frequency-Division Multiplexing (FDM), which use orthogonality of transmission resources. Here, thanks to advancements in signal-processing technology, Layered-Division Multiplexing (LDM), through which two or more broadcast services can be individually provided without maintaining orthogonality of transmission resources, has been recently adopted. LDM is technology for transmitting two different broadcast signals with the same or different power levels by sharing time and frequency resources, and the two broadcast signals can be reconstructed at the receiving end using a characteristic that the two broadcast signals have different levels of reception quality.

LDM based on sharing of orthogonal transmission resources may improve transmission efficiency by a maximum of 30% compared to existing TDM or FDM. The current terrestrial broadcast system applies LDM using only two layers. Among these two layers, the layer corresponding to a higher power level and a signal having robust reception performance is called a Core Layer (CL), and the other layer is called an Enhanced Layer (EL). Generally, the core layer is used to provide a broadcast service for the case in which image quality is expected to be low and reception conditions are poor, such as mobile broadcasting for smartphones or media terminals in vehicles, and the enhanced layer is used to provide a high-definition service suitable for large screens, such as televisions in a household, and in fixed reception environments.

Terrestrial broadcast systems adopted to date support transmission for MIMO technology and for LDM technology separately, but do not support transmission technology in which the two technologies are combined.

Figure 2:
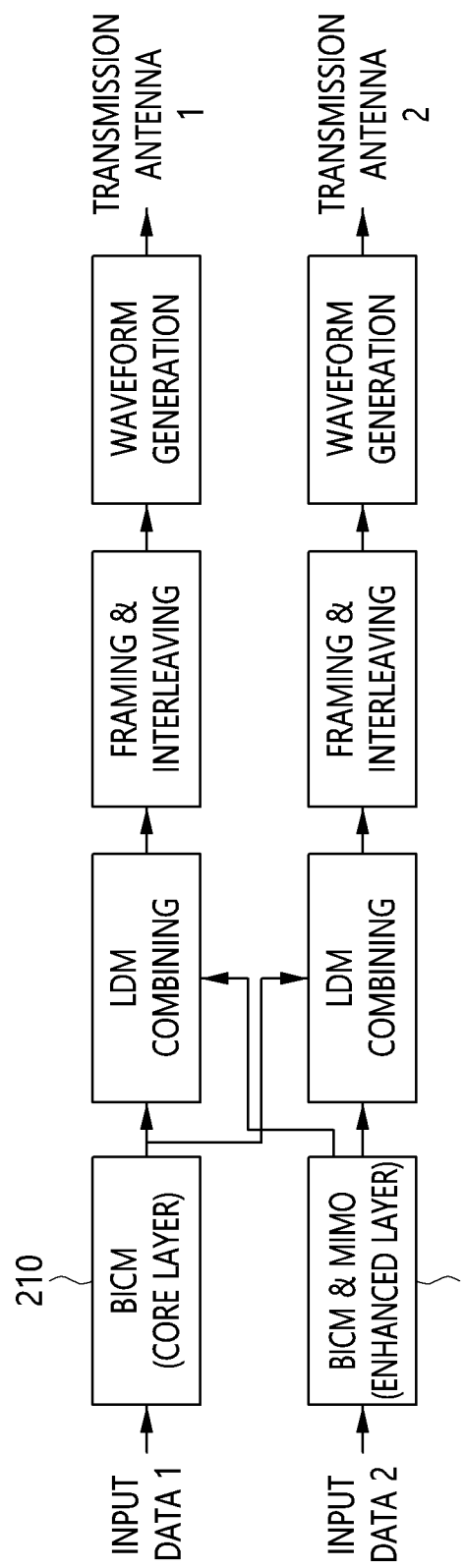

FIG. 1 and FIG. 2 are views illustrating an example of a system in which MIMO and LDM are combined.

First, referring to FIG. 1, an embodiment of a terrestrial broadcast system in which MIMO and LDM are combined is illustrated.

Input data 1 transferred using a core layer is transmitted using only transmission antenna 1.

Input data 2, transferred using an enhanced layer, is divided into two different streams through a BICM and MIMO module 120 by applying MIMO thereto. Here, one of the streams applies LDM thereto by being combined with a core layer, and the other one thereof applies LDM by matching the power ratio thereof to the enhanced layer combined with the core layer, without being combined with the core layer.

Also, the respective signals are transferred to transmission antennas 1 and 2 via a framing and interleaving module and a waveform generation module.

Also, referring to FIG. 2, another embodiment of a terrestrial broadcast system in which MIMO and LDM are combined is illustrated.

Input data 1 transferred using a core layer is transmitted using both transmission antennas 1 and 2.

As in the embodiment of FIG. 1, MIMO is applied only to an enhanced layer for transferring input data 2.

However, in the embodiment of FIG. 2, input data 2 is generated as two streams through a BICM and MIMO module 220 by applying MIMO thereto, after which the two streams are combined with the same core layer and respectively transmitted using transmission antennas 1 and 2.

Figure 3:
FIG. 3 and FIG. 4 are views illustrating an example of a reception terminal that receives a signal in which MIMO and LDM are combined.
Figure 4:
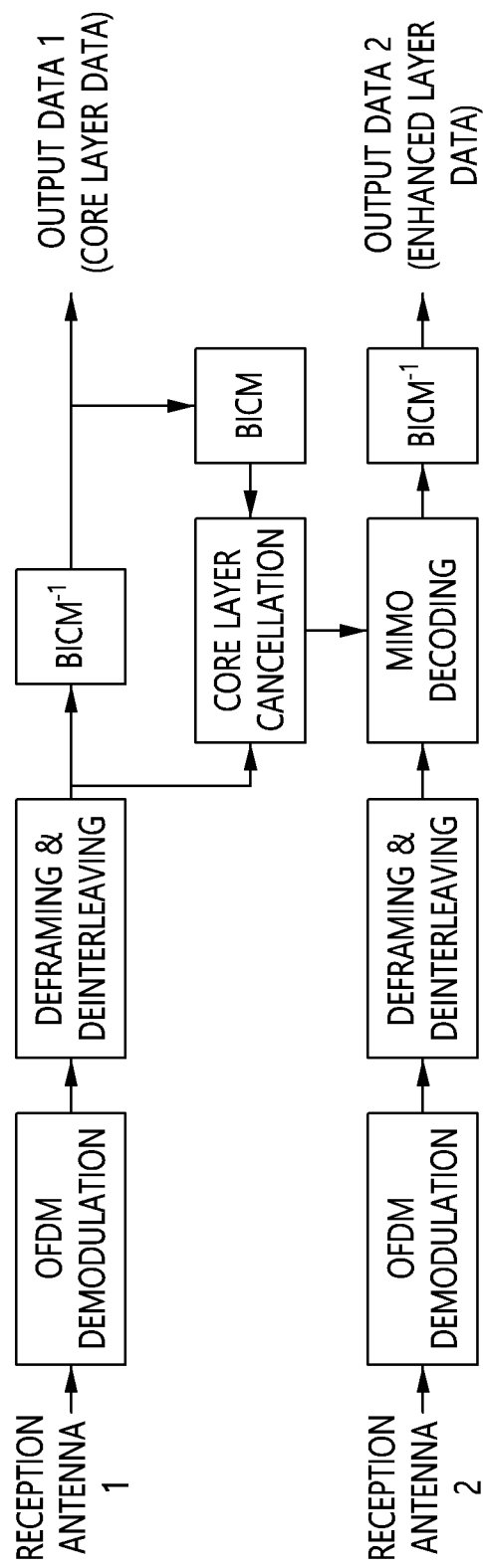

FIG. 3 and FIG. 4 are views illustrating an example of a reception terminal that receives a signal in which MIMO and LDM are combined.

First, referring to FIG. 3, an embodiment of a reception terminal that receives a broadcast signal in which MIMO and LDM are combined is illustrated.

The reception terminal illustrated in FIG. 3 includes a single reception antenna, and because it is able to receive only conventional broadcast signals, only a core layer signal may be received. Also, only the channel environment between transmission antenna 1 and reception antenna 1 may be estimated.

Also, referring to FIG. 4, another embodiment of a reception terminal that receives a broadcast signal in which MIMO and LDM are combined is illustrated.

The reception terminal illustrated in FIG. 4 includes two reception antennas, and is able to receive multiple-antenna signals transmitted from transmission antennas 1 and 2. Accordingly, all of the channel environments between the respective transmission and reception antennas may be estimated.

For example, the reception terminal illustrated in FIG. 4 reconstructs core layer data from the signal of reception antenna 1 and removes a core layer signal from the signal of reception antenna 1, thereby acquiring the enhanced layer signal transmitted to reception antenna 1. Subsequently, enhanced layer data may be reconstructed from the enhanced layer signal transferred through the two reception antennas by performing MIMO decoding.

In another example, the reception terminal illustrated in FIG. 4 reconstructs core layer data from the signal of reception antenna 1 and removes a core layer signal from the signal of reception antenna 1, thereby acquiring the enhanced layer signal transmitted to reception antenna 1. Simultaneously, the reception terminal illustrated in FIG. 4 reconstructs core layer data from the signal of reception antenna 2 and removes a core layer signal from the signal of reception antenna 2, thereby acquiring the enhanced layer signal transmitted to reception antenna 2. Subsequently, enhanced layer data may be reconstructed from the enhanced layer signals transferred through the two reception antennas by performing MIMO decoding.

When MIMO is applied only to an enhanced layer, as in the embodiments of FIG. 1 and FIG. 2, an existing receiver configured as shown in the embodiment of FIG. 3 regards an enhanced layer signal as a noise signal, but is able to receive a terrestrial broadcast service transferred through a core layer without change.

However, the receiver configured as shown in the embodiment of FIG. 4 is able to reconstruct an enhanced layer signal, to which MIMO is applied, only when signaling information about a combination of MIMO and LDM is acquired.

Accordingly, a broadcast signal according to the embodiments illustrated in FIG. 1 and FIG. 2 has to be configured to transfer signaling that is different from that of an existing broadcast signal, and a method enabling a signal in which MIMO and LDM are combined to be transmitted and received while solving the problem of compatibility with existing receivers is required.

Hereinafter, a process of transmitting and receiving a broadcast signal for signaling information about whether MIMO is applied to an enhanced layer and information about the method of applying MIMO to the enhanced layer, which have not been defined elsewhere, will be described in detail.

Figure 5:
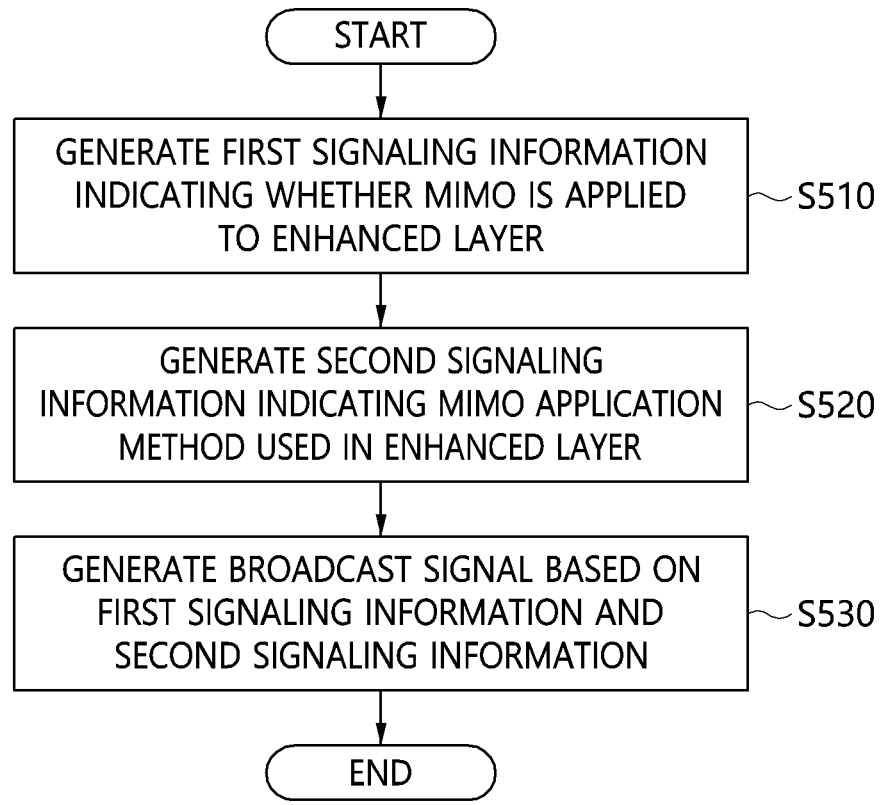
FIG. 5 is a flowchart illustrating a method for transmitting a broadcast signal according to an embodiment of the present invention.

FIG. 5 is a flowchart illustrating a method for transmitting a broadcast signal according to an embodiment of the present invention.

Referring to FIG. 5, in the method for transmitting a broadcast signal according to an embodiment of the present invention, first signaling information indicating whether Multiple-Input Multiple-Output (MIMO) is applied to an enhanced layer by Layered-Division Multiplexing (LDM) is generated at step S510.

Figure 6:
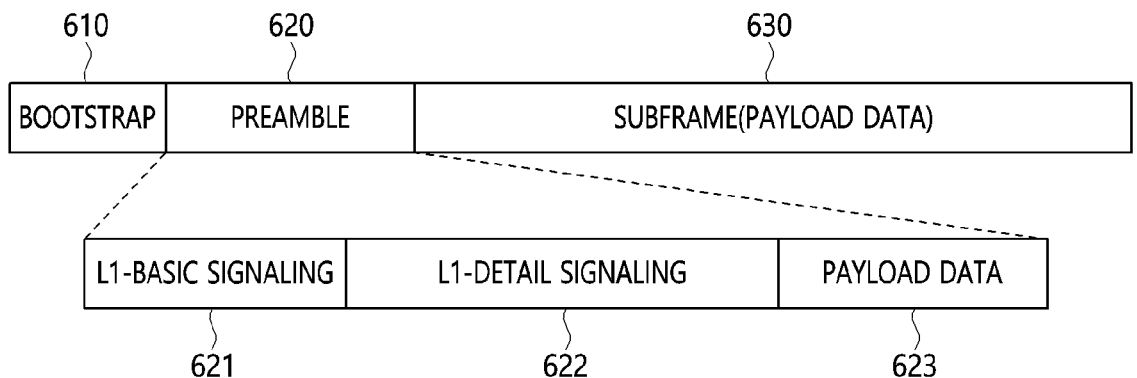
FIG. 6 is a view illustrating an example of the structure of a transmission signal frame of a terrestrial broadcast system according to the present invention.

Referring to FIG. 6, a transmission signal of a terrestrial broadcast system is configured such that transmission information is acquired in phases through a hierarchical structure.

For example, a transmission unit transfers minimum transmission information for decoding a current preamble 620 using a bootstrap 610, and transfers L1-signaling of a subframe 630 for transferring current channel information and actual payload data using the preamble 620.

L1-signaling includes L1-Basic signaling 621 and L1-Detail signaling 622.

The L1-Basic signaling 621 may include information for describing a broadcast signal transmission structure, a reference time, information for understanding the overall transmission structure of a first subframe, and the like.

Here, each subframe may be combined with Physical Layer Pipes (PLPs), which are multiple payload data groups having different signal qualities through multiplexing.

Accordingly, information about the overall transmission structure of subframes subsequent to the first subframe and a transmission method applied to the PLPs of all of the subframes including the first subframe may be transferred using the L1-Detail signaling 622.

Here, because MIMO can be applied to each subframe, first signaling information may be configured for each subframe.

Here, first signaling information for the first subframe of a broadcast signal is included in the L1-Basic signaling of the preamble of the broadcast signal, and first signaling information for the current subframe, subsequent to the first subframe, in the broadcast signal may be included in the L1-Detail signaling of the preamble.

For example, signaling about the method of transmitting a broadcast signal by applying a combination of MIMO and LDM to the first subframe may be defined as shown in FIG. 7.

According to L1B_first_sub_mimo_ldm defined in FIG. 7, when MIMO is not applied to the enhanced layer of a first subframe, a value of 0 may be transferred, whereas when MIMO is applied to the enhanced layer of the first subframe, a value of 1 may be transferred. Here, L1B_first_sub_mimo_ldm defined in FIG. 7 may be included in the L1-Basic signaling 621 illustrated in FIG. 6.

In another example, signaling about the method of transmitting a broadcast signal by applying a combination of MIMO and LDM to a current subframe subsequent to the first subframe may be defined as shown in FIG. 8.

According to L1D_mimo_ldm defined in FIG. 8, when MIMO is not applied to the enhanced layer of the current subframe subsequent to the first subframe, a value of 0 may be transferred, whereas when MIMO is applied thereto, a value of 1 may be transferred. Here, L1D_mimo_ldm defined in FIG. 8 may be included in the L1-Detail signaling 622 illustrated in FIG. 6.

Also, in the method for transmitting a broadcast signal according to an embodiment of the present invention, when MIMO is applied to the enhanced layer, second signaling information indicating the MIMO application method is generated at step S520.

Figure 9:
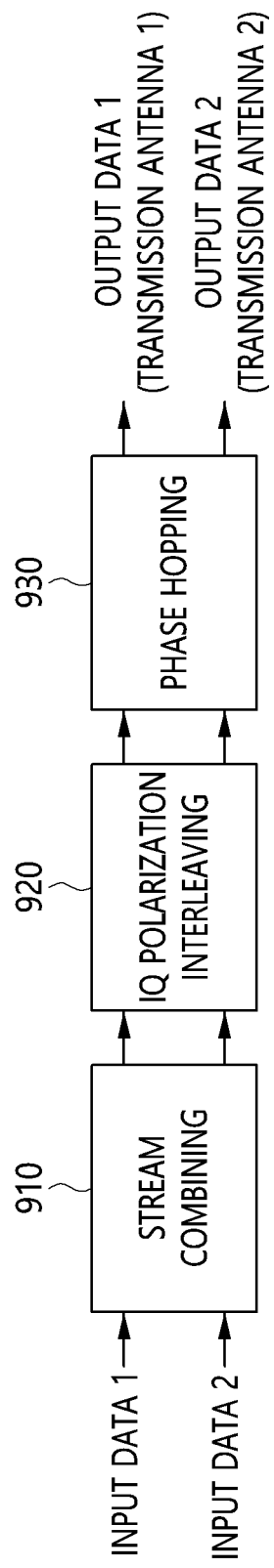
FIG. 9 is a view illustrating an example of detailed precoding technical blocks of MIMO according to the present invention.

Referring to FIG. 9, MIMO applied to a terrestrial broadcast system may be configured with three technical details, which are stream-combining 910, IQ polarization interleaving 920, and phase-hopping 930. Accordingly, applying MIMO to a broadcast signal may be applying all of these three techniques, applying none of these three techniques, or applying a combination of one or more selected therefrom, and the MIMO application method may indicate the techniques that are applied.

Here, the second signaling information may be included in the L1-Detail signaling of the preamble.

That is, the second signaling information may be included in the L1-Detail signaling 622 illustrated in FIG. 6.

Here, the second signaling information may include information about whether stream-combining is applied to the Physical Layer Pipe (PLP) corresponding to the enhanced layer, whether IQ polarization interleaving is applied to the physical layer pipe, and whether phase-hopping is applied to the physical layer pipe.

Hereinafter, signaling information about the method of applying the technical details of MIMO to the physical layer pipe of an enhanced layer will be described in detail with reference to FIGS. 10 to 12.

For example, signaling indicating whether stream-combining is applied to the physical layer pipe of an enhanced layer may be defined as shown in FIG. 10.

According to L1D_plp_el_mimo_stream_combining defined in FIG. 10, when stream-combining is not applied to the physical layer pipe corresponding to the enhanced layer, a value of 0 may be transferred, whereas when stream-combining is applied thereto, a value of 1 may be transferred.

In another example, signaling indicating whether IQ polarization interleaving is applied to the physical layer pipe of an enhanced layer may be defined as shown in FIG. 11.

According to L1D_plp_el_mimo_IQ_interleaving defined in FIG. 11, when IQ polarization interleaving is not applied to the physical layer pipe corresponding to the enhanced layer, a value of 0 may be transferred, whereas when IQ polarization interleaving is applied thereto, a value of 1 may be transferred.

In another example, signaling indicating whether phase-hopping is applied to the physical layer pipe of an enhanced layer may be defined as shown in FIG. 12.

According to L1D_plp_el_mimo_PH defined in FIG. 12, when phase-hopping is not applied to the physical layer corresponding to the enhanced layer, a value of 0 may be transferred, whereas when phase-hopping is applied thereto, a value of 1 may be transferred.

Because these three types of signaling defined in FIGS. 10 to 12 are information about transmission method details for a physical layer pipe, they may be included in the L1-Detail signaling 622 illustrated in FIG. 6.

Also, in the method for transmitting a broadcast signal according to an embodiment of the present invention, a broadcast signal is generated using the first signaling information and the second signaling information at step S530.

Here, the first signaling information may be generated for each subframe of the broadcast signal, and the second signaling information may be generated for each Physical Layer Pipe (PLP) corresponding to the enhanced layer.

Here, upon receiving a broadcast signal, a first receiver, which supports only LDM, may reconstruct only a signal transferred through a core layer and process a signal transferred through an enhanced layer as a noise signal.

Here, in order to enable an existing receiver like the first receiver to receive a core layer signal normally, it is necessary to maintain L1-signaling information and the configuration thereof to be the same as the existing one. Here, when the transmission structure is configured as shown in FIG. 1 and FIG. 2, each subframe and signals multiplexed therein may be maintained without change.

Accordingly, when information about whether MIMO is applied to an enhanced layer and information about the MIMO application method are added so as to follow the existing signaling information of L1-Basic signaling and L1-Detail signaling, transmission and reception to which a combination of MIMO and LDM is applied may be implemented without affecting the existing receiver.

Table 1 and Table 2 below illustrate an example of signaling capable of providing information about a combination of MIMO and LDM, without affecting signaling that has to be acquired by an existing receiver.

TABLE 1

| Syntax | No. of Bits | Format |
|---|---|---|
| L1_Basic_Signaling( ) { | | |
|   L1B_version | 3 | uimsbf |
|   L1B_mimo_scattered_pilot_encoding | 1 | uimsbf |
|   L1B_lls_flag | 1 | uimsbf |
|   L1B_time_info_flag | 2 | uimsbf |
|   L1B_return_channel_flag | 1 | uimsbf |
|   L1B_papr_reduction | 2 | uimsbf |
|   L1B_frame_length_mode | 1 | uimsbf |
|   if(L1B_frame_length_mode=0){ | | |
|     L1B_frame_length | 10 | uimsbf |
|     L1B_excess_samples_per_symbol | 13 | uimsbf |
|   }else{ | | |
|     L1B_time_offset | 16 | uimsbf |
|     L1B_additional_samples | 7 | uimsbf |
|   } | | |
|   L1B_num_subframes | 8 | uimsbf |
|   L1B_preamble_num_symbols | 3 | uimsbf |
|   L1B_preamble_reduced_carriers | 3 | uimsbf |
|   L1B_L1_Detail_content_tag | 2 | uimsbf |
|   L1B_L1_Detail_size_bytes | 13 | uimsbf |
|   L1B_L1_Detail_fec_type | 3 | uimsbf |
|   L1B_L1_Detail_additional_parity_mode | 2 | uimsbf |
|   L1B_L1_Detail_total_cells | 19 | uimsbf |
|   L1B_first_sub_mimo | 1 | uimsbf |
|   L1B_first_sub_miso | 2 | uimsbf |
|   L1B_first_sub_fft_size | 2 | uimsbf |
|   L1B_first_sub_reduced_carriers | 3 | uimsbf |
|   L1B_first_sub_guard_interval | 4 | uimsbf |
|   L1B_first_sub_num_ofdm_symbols | 11 | uimsbf |
|   L1B_first_sub_scattered_pilot_pattern | 5 | uimsbf |
|   L1B_first_sub_scattered_pilot_boost | 3 | uimsbf |
|   L1B_first_sub_sbs_first | 1 | uimsbf |
|   L1B_first_sub_sbs_last | 1 | uimsbf |
|   L1B_first_sub_mimo_ldm | 1 | uimsbf |
|   L1B_reserved | 47 | uimsbf |
|   L1B_crc | 32 | uimsbf |
| } | | |

First, Table 1 illustrates an example of L1_Basic_Signaling, including L1B_first_sub_mimo_ldm signaling indicating whether a combination of MIMO and LDM is applied to a first subframe.

TABLE 2

| Syntax | No. of Bits | Format |
|---|---|---|
| L1_Detail_Signaling( ) { | | |
|   L1D_version | 4 | uimsbf |
|   L1D_num_rf | 3 | uimsbf |
|   for(L1D_rf_id= 1..L1D_num_rf){ | | |
|     L1D_bonded_bsid | 16 | uimsbf |
|     reserved | 3 | bslbf |
|   } | | |
|   if(L1D_time_info_flag !=00){ | | |
|     L1D_time_sec | 32 | uimsbf |
|     L1D_time_msec | 10 | uimsbf |
|     if(L1B_time_info_flag !=01){ | | |
|       L1D_time_usec | 10 | uimsbf |
|       if(L1B_time_info_flag !=10){ | | |
|         L1D_time_nsec | 10 | uimsbf |
|       } | | |
|     } | | |
|   } | | |
|   for(i=0..L1B_num_subframes){ | | |
|   if(i>0){ | | |
|     L1D_mimo | 1 | uimsbf |
|     L1D_miso | 2 | uimsbf |
|     L1D_fft_size | 2 | uimsbf |
|     L1D_reduced_carriers | 3 | uimsbf |
|     L1D_guard_interval | 4 | uimsbf |
|     L1D_num_ofdm_sumbols | 11 | uimsbf |
|     L1D_scattered_pilot_pattern | 5 | uimsbf |

TABLE 2-continued

| Syntax | No. of Bits | Format |
|---|---|---|
|     L1D_scattered_pilot_boost | 3 | uimsbf |
|     L1D_sbs_first | 1 | uimsbf |
|     L1D_sbs_last | 1 | uimsbf |
| } | | |
| If(L1B_num_subframes>0){ | | |
|     L1D_subframe_multiplex | 1 | uimsbf |
| } | | |
|     L1D_frequency_interleaver | 1 | uimsbf |
|     if(((i=0)&&(L1B_first_sub_sbs_first\|\|L1B_first_sub_sbs_last))\|\| | | |
|     ((i>0)&&(L1D_sbs_first\|L1D_sbs_last))){ | | |
|         L1D_sbs_null_cells | 13 | uimsbf |
|     } | | |
| L1D_num_plp | 6 | uimsbf |
| for(i=0..L1D_num_plp){ | | |
| L1D_plp_id | 6 | uimsbf |
|     L1D_plp_lls_flag | 1 | uimsbf |
|     L1D_plp_layer | 2 | uimsbf |
|     L1D_plp_start | 24 | uimsbf |
|     L1D_plp_size | 24 | uimsbf |
| L1D_scrambler_type | 2 | uimsbf |
|     L1D_plp_fec_type | 4 | uimsbf |
|     if(L1D_plp_fec_type∈{0,1,2,3,4,5}){ | | |
|     L1D_plp_mod | 4 | uimsbf |
|         L1D_plp_cod | 4 | uimsbf |
|     } | | |
|     L1D_plp_TI_mode | 2 | uimsbf |
|     if(L1D_plp_TI_mode=00){ | | |
|     L1D_plp_fec_block_start | 15 | uimsbf |
|     }else if(L1D_plp_TI_mode=01){ | | |
|         L1D_plp_CTI_fec_block_start | 22 | uimsbf |
|     } | | |
|     if(L1D_num_rf>0){ | | |
|         L1D_plp_num_channel_bonded | 3 | uimsbf |
|         if(L1D_plp_num_channel_bonded>0){ | | |
|             L1D_plp_channel_bonding_format | 2 | uimsbf |
|             for(k=0..L1D_plp_num_channel_bonded){ | | |
|                 L1D_plp_bonded_rf_id | 3 | uimsbf |
|             } | | |
|         } | | |
|     } | | |
|     if(i=0&&L1B_first_sub_mimo=1)\|\|(i>0&&L1D_mimo=!){ | | |
|         L1D_plp_mimo_stream_combining | 1 | uimsbf |
| L1D_plp_mimo_IQ_interleaving | 1 | uimsbf |
| L1D_plp_mimo_PH | 1 | uimsbf |
|     } | | |
|     if(L1D_plp_layer=0){ | | |
|     L1D_plp_type | 1 | uimsbf |
|     if(L1D_plp_type=1){ | | |
| L1D_plp_num_subslices | 14 | uimsbf |
| L1D_plp_subslice_interval | 24 | uimsbf |
|     } | | |
|         if(((L1D_plp_TI_mode=01)\|\| | | |
|         (L1D_plp_TI_mode=10))&&(L1D_plp_mod=0000)){ | | |
|             L1D_plp_TI_extended_interleaving | 1 | uimsbf |
|         } | | |
|         if(L1D_plp_TI_mode=01){ | | |
|             L1D_plp_CTI_depth | 3 | uimsbf |
| L1D_plp_CTI_start_row | 11 | uimsbf |
|         }else if(L1D_plp_TI_mode=10){ | | |
| L1D_plp_HTI_inter_subframe | 1 | uimsbf |
| L1D_plp_HTI_num_ti_blocks | 4 | uimsbf |
| L1D_plp_HTI_num_fec_blocks_max | 12 | uimsbf |
| if(L1D_plp_HTI_inter_subframe=0){ | | |
|   L1D_plp_HTI_num_fec_blocks | 12 | uimsbf |
| }else { | | |
| for(k=0..L1D_plp_HTI_num_ti_blocks){ | | |
| L1D_plp_HTI_num_fec_blocks | 12 | uimsbf |
| } | | |
|             L1D_plp_HTI_cell_interleaver | 1 | uimsbf |
|         } | | |
|     } | | |
|     L1D_bsid | 16 | uimsbf |
| for(i=0..L1B_num_subframes){ | | |
|   if(i>0){ | | |
|     L1D_mimo_ldm | 1 | uimsbf |
|   } | | |

TABLE 2-continued

| Syntax | No. of Bits | Format |
|---|---|---|
|     if(i=0&&L1B_first_sub_mimo_ldm=1)\|\|(i>0&&L1D_mimo_ldm=1){ | | |
|         for(i=0..L1D_num_plp){ | | |
|             if(L1D_plp_layer>0){ | | |
|                 L1D_plp_el_mimo_stream_combining | 1 | uimsbf |
|                 L1D_plp_el_mimo_IQ_interleaving | 1 | uimsbf |
|                 L1D_plp_el_mimo_PH | 1 | uimsbf |
|             } | | |
|         } | | |
|     } | | |
| } | | |
| L1D_reserved | as needed | |
|     L1D_crc | 32 | |
| } | | |

Also, Table 2 illustrates an example of L1-Detail signaling, including L1D_mimo_ldm signaling, indicating whether a combination of MIMO and LDM is applied to a subframe subsequent to the first subframe and L1D_plp_el_mimo_stream_combining signaling, L1D_plp_el_mimo_IQ_interleaving signaling, and L1D_plp_el_mimo_PH signaling, which indicate the method of applying MIMO to the physical layer pipe of the enhanced layer of the subframe.

Here, the signaling about the method of applying MIMO may be transmitted only when a combination of MIMO and LDM is applied.

Here, an existing receiver, such as the first receiver, may read L1-Basic signaling illustrated in Table 1 to L1B_first_sub_sbs_last, which is the part that is interpretable thereby, and interpret the same to operate based thereon, and may process the remainder, including L1B_first_sub_mimo_ldm, as L1B reserved. Also, the existing receiver may read L1-Detail signaling illustrated in Table 2 to L1D_bsid, which is the part that is interpretable thereby, and interpret the same to operate based thereon, and may regard the remainder as L1D_reserved.

Accordingly, the existing receiver, like the first receiver, determines that LDM is applied to the received terrestrial broadcast signal although MIMO is not applied thereto, thereby decoding only a core layer signal.

Here, because MIMO is applied to the enhanced layer signal of the terrestrial broadcast signal, the existing receiver may recognize the enhanced layer signal as noise that cannot be decoded.

Here, a second receiver, which supports both LDM and MIMO, may reconstruct not only the signal transferred through the core layer but also the signal transferred through the enhanced layer based on the first signaling information and the second signaling information.

For example, the second receiver, having multiple reception antennas to which a combination of MIMO and LDM is applied, may acquire information about whether MIMO is applied to the enhanced layer of the first subframe through L1B_first_sub_mimo_ldm signaling of L1-Basic signaling according to the embodiment of Table 1. Also, when multiple subframes are present, whether MIMO is applied to the enhanced layer of a subsequent subframe can be seen through L1D_mimo_ldm signaling of L1-Detail signaling according to the embodiment of Table 2.

When the second receiver recognizes application of MIMO to the enhanced layer through the two types of signaling, the method of applying the technical details of MIMO to the physical layer pipe of the enhanced layer in the subframe may be checked through L1D_plp_el_mimo_stream_combining signaling, L1D_plp_el_mimo_IQ_interleaving signaling, and L1D_plp_el_mimo_PH signaling.

Here, when MIMO is applied to the enhanced layer of a certain subframe, the second receiver receives signals using two reception antennas and performs channel estimation for all of the paths through which the MIMO signals are transmitted (e.g., a channel from transmission antenna 1 to reception antenna 1, a channel from transmission antenna 1 to reception antenna 2, a channel from transmission antenna 2 to reception antenna 1, and a channel from transmission antenna 2 to reception antenna 2), thereby decoding the signals.

Through the above-described method for transmitting a broadcast signal, the performance of a broadcast system to which MIMO and LDM are applied may be improved.

Also, when a signal in which MIMO and LDM are combined is transmitted and when signaling information for accessing the signal is transferred, the performance of a broadcast system may be efficiently improved, and various services may be provided.

Figures 14, 15:
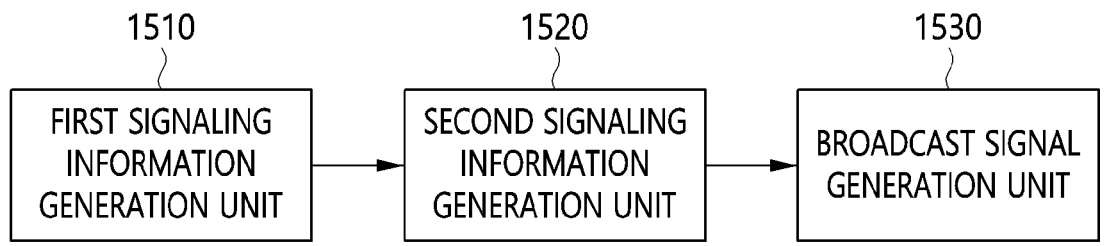
FIG. 14 is a view illustrating an example of a definition of signaling indicating whether MIMO is applied to an enhanced layer only of a subframe to which LDM is applied according to the present invention.
FIG. 15 is a block diagram illustrating an apparatus for transmitting a broadcast signal according to an embodiment of the present invention.

FIG. 14 is a view illustrating an example of a definition of signaling indicating whether MIMO is applied to an enhanced layer only of a subframe to which LDM is applied according to the present invention.

Hereinafter, a method for transmitting a broadcast signal that includes first signaling information, indicating whether MIMO is applied to an enhanced layer by LDM, in the L1-Detail signaling of the preamble thereof will be described in detail with reference to Table 3 and FIG. 14.

As described above, in the method for transmitting a broadcast signal according to an embodiment of the present invention, first signaling information indicating whether MIMO is applied to an enhanced layer by LDM is generated.

Also, in the method for transmitting a broadcast signal according to an embodiment of the present invention, when MIMO is applied to the enhanced layer, second signaling information indicating an MIMO application method is generated.

Also, in the method for transmitting a broadcast signal according to an embodiment of the present invention, a broadcast signal is generated using the first signaling information and the second signaling information.

Here, the first signaling information may be included in the L1-Detail signaling of the preamble of the broadcast signal.

Here, the first signaling information may be generated for each subframe of the broadcast signal or only for a subframe to which LDM is applied, among all of the subframes of the broadcast signal.

Table 3 below illustrates an example in which information about a transmission and reception method to which a combination of MIMO and LDM is applied is configured using only L1-Detail signaling.

TABLE 3

| Syntax | No. of Bits | Format |
|---|---|---|
| L1_Detail_Signaling( ) { | | |
|   L1D_version | 4 | uimsbf |
|   L1D_num_rf | 3 | uimsbf |
|   for(L1D_rf_id=1..L1D_num_rf){ | | |
|     L1D_bonded_bsid | 16 | uimsbf |
|     reserved | 3 | bslbf |
|   } | | |
|   if(L1B_time_info_flag !=00){ | | |
|     L1D_time_sec | 32 | uimsbf |
|     L1D_time_msec | 10 | uimsbf |
|       if(L1B_time_info_flag !=01){ | | |
|         L1D_time_usec | 10 | uimsbf |
|         if(L1B_time_info_flag !=10){ | | |
|           L1D_time_nsec | 10 | uimsbf |
|         } | | |
|       } | | |
|   } | | |
|   for(i=0..L1B_num_subframes){ | | |
|     if(i>0){ | | |
|       L1D_mimo | 1 | uimsbf |
|       L1D_miso | 2 | uimsbf |
|       L1D_fft_size | 2 | uimsbf |
|       L1D_reduced_carriers | 3 | uimsbf |
|       L1D_guard_interval | 4 | uimsbf |
|       L1D_num_ofdm_sumbols | 11 | uimsbf |
|       L1D_scattered_pilot_pattern | 5 | uimsbf |
|       L1D_scattered_pilot_boost | 3 | uimsbf |
|       L1D_sbs_first | 1 | uimsbf |
|       L1D_sbs_last | 1 | uimsbf |
|     } | | |
| if(L1B_num_subframes>0){ | | |
| L1D_subframe_multiplex | 1 | uimsbf |
|   } | | |
|   L1D_frequency_interleaver | 1 | uimsbf |
|   if(((i=0)&&(L1B_first_sub_sbs_first\|\|L1B_first_sub_sbs_last))\|\| | | |
|     ((i>0)&&(L1D_sbs_first\|L1D_sbs_last))){ | | |
|     L1D_sbs_null_cells | 13 | uimsbf |
|   } | | |
| L1D_num_plp | 6 | uimsbf |
| for(i=0..L1D_num_plp){ | | |
| L1D_plp_id | 6 | uimsbf |
|   L1D_plp_lls_flag | 1 | uimsbf |
|   L1D_plp_layer | 2 | uimsbf |
|   L1D_plp_start | 24 | uimsbf |
|   L1D_plp_size | 24 | uimsbf |
| L1D_scrambler_type | 2 | uimsbf |
|   L1D_plp_fec_type | 4 | uimsbf |
|   if(L1D_plp_fec_type∈{0,1,2,3,4,5}){ | | |
|     L1D_plp_mod | 4 | uimsbf |
|       L1D_plp_cod | 4 | uimsbf |
|   } | | |
|   L1D_plp_TI_mode | 2 | uimsbf |
|   if(L1D_plp_TI_mode=00){ | | |
|   L1D_plp_fec_block_start | 15 | uimsbf |
|   }else if(L1D_plp_TI_mode=01){ | | |
|     L1D_plp_CTI_fec_block_start | 22 | uimsbf |
|   } | | |
|   if(L1D_num_rf>0)){ | | |
|     L1D_plp_num_channel_bonded | 3 | uimsbf |
|     if(L1D_plp_num_channel_bonded>0){ | | |
|       L1D_plp_channel_bonding_format | 2 | uimsbf |
|       for(k=0..L1D_plp_num_channel_bonded){ | | |
|         L1D_plp_bonded_rf_id | 3 | uimsbf |
|       } | | |
|     } | | |
|   } | | |
|   if(i=0&&L1B_first_sub_mimo=1)\|\|(i>0&&L1D_mimo=1){ | | |
|     L1D_plp_mimo_stream_combining | 1 | uimsbf |

TABLE 3-continued

| Syntax | No. of Bits | Format |
|---|---|---|
| L1D_plp_mimo_IQ_interleaving | 1 | uimsbf |
| L1D_plp_mimo_PH | 1 | uimsbf |
| } | | |
|   if(L1D_plp_layer=0){ | | |
|     L1D_plp_type | 1 | uimsbf |
|     if(L1D_plp_type=1){ | | |
| L1D_plp_num_subslices | 14 | uimsbf |
| L1D_plp_subslice_interval | 24 | uimsbf |
|     } | | |
|     if(((L1D_plp_TI_mode=01)|| | | |
|     (L1D_plp_TI_mode=10))&&(L1D_plp_mod=0000)){ | | |
|       L1D_plp_TI_extended_interleaving | 1 | uimsbf |
|     } | | |
|     if(L1D_plp_TI_mode=01){ | | |
|       L1D_plp_CTI_depth | 3 | uimsbf |
| L1D_plp_CTI_start_row | 11 | uimsbf |
|     }else if(L1D_plp_TI_mode=10){ | | |
| L1D_plp_HTI_inter_subframe | 1 | uimsbf |
| L1D_plp_HTI_num_ti_blocks | 4 | uimsbf |
| L1D_plp_HTI_num_fec_blocks_max | 12 | uimsbf |
| if(L1D_plp_HTI_inter_subframe=0){ | | |
|   L1D_plp_HTI_num_fec_blocks | 12 | uimsbf |
| }else { | | |
| for(k=0..L1D_plp_HTI_num_ti_blocks){ | | |
| L1D_plp_HTI_num_fec_blocks | 12 | uimsbf |
| } | | |
|     } | | |
|     L1D_plp_HTI_cell_interleaver | 1 | uimsbf |
|   } | | |
|   } | | |
| } | | |
|   L1D_bsid | 16 | uimsbf |
| for(i=0..L1B_num_subframes){ | | |
|   L1D_mimo_ldm | 1 | uimsbf |
|   if(L1D_mimo_ldm=1){ | | |
|     for(i=0..L1D_num_plp){ | | |
|       if(L1D_plp_layer>0){ | | |
| L1D_plp_el_mimo_stream_combining | 1 | uimsbf |
| L1D_plp_el_mimo_IQ_interleaving | 1 | uimsbf |
| L1D_plp_el_mimo_PH | 1 | uimsbf |
|       } | | |
|     } | | |
|   } | | |
| } | | |
| L1D_reserved | as needed | |
|   L1D_crc | 32 | |
| } | | |

MIMO based on ATSC 3.0 is not applied to a preamble.

Also, because signaling related to application of LDM and the method therefor is presented in L1-Detail signaling, information about a combination of MIMO and LDM may be specified merely by changing the configuration of L1-Detail signaling, as shown in the embodiment in Table 3.

Here, L1D_mimo_ldm, which is an embodiment of signaling indicating whether a combination of MIMO and LDM is applied to the current subframe, including the first subframe, may be defined as shown in FIG. 13 and used.

That is, L1B_first_sub_mimo_ldm and L1D_mimo_ldm according to the embodiments in FIGS. 7 and 8 are combined as a single type of signaling, that is, L1D_mimo_ldm illustrated in FIG. 13, whereby a subframe in which MIMO and LDM are combined may be identified.

Therefore, the embodiment of Table 3 has an advantage in that it can reduce a change in the configuration of signaling information recognizable by an existing receiver because L1_Basic signaling is the same as that used for current terrestrial broadcast transmission.

For example, when the existing receiver illustrated in FIG. 3 receives the signaling shown in Table 3, it acquires transmission information by reading all of L1-Basic signaling, which has the same configuration as the existing configuration, and acquires information of L1-Detail signaling by reading the same from the beginning to L1D_bsid, after which it may decode a transmission signal transferred through a core layer.

In another example, when a receiver, which supports a combination of MIMO and LDM as illustrated in FIG. 4, receives the signaling shown in Table 3, it may check whether MIMO is applied to an enhanced layer through L1D_mimo_ldm signaling presented after L1D_bsid. Also, information about the method of applying MIMO to the enhanced layer is acquired through L1D_plp_el_mimo_stream_combining signaling, L1D_plp_el_mimo_IQ_interleaving signaling, and L1D_plp_el_mimo_PH signaling, whereby the enhanced layer signal may be decoded.

Also, the embodiment of the L1-Detail signaling in Table 3 may be used as signaling indicating whether MIMO is applied to the enhanced layer only of the subframe to which LDM is applied.

Because information about whether LDM is applied to each subframe can be acquired from signaling information interpretable by an existing receiver (that is, signaling information to L1D_bsid), L1D_mimo_ldm, which is an example of signaling indicating whether MIMO is applied to the enhanced layer only of the subframe to which LDM is applied, may be defined as shown in FIG. 14 and used.

According to L1D_mimo_ldm defined in FIG. 14, when MIMO is not applied to the enhanced layer signal of a subframe to which LDM is applied, 0 may be transferred, whereas when MIMO is applied thereto, 1 may be transferred.

Here, when the value of L1D_mimo_ldm signaling is 1, the transmitter according to an embodiment of the present invention may additionally transmit information about the method of application of MIMO to the enhanced layer according to the embodiments of FIGS. 10 to 12.

Therefore, there is an advantage in that transmission efficiency may be improved by reducing the number of pieces of signaling information.

FIG. 15 is a block diagram illustrating an apparatus for transmitting a broadcast signal according to an embodiment of the present invention.

Referring to FIG. 15, the apparatus for transmitting a broadcast signal according to an embodiment of the present invention includes a first signaling information generation unit 1510, a second signaling information generation unit 1520, and a broadcast signal generation unit 1530.

The first signaling information generation unit 1510 generates first signaling information indicating whether Multiple-Input Multiple-Output (MIMO) is applied to an enhanced layer by Layered-Division Multiplexing (LDM).

Here, the first signaling information for the first subframe of a broadcast signal may be included in L1-Basic signaling of the preamble of the broadcast signal, and the first signaling information for a current subframe subsequent to the first subframe in the broadcast signal may be included in L1-Detail signaling of the preamble.

Also, the first signaling information may be included in L1-Detail signaling of a preamble of the broadcast signal.

The second signaling information generation unit 1520 generates second signaling information indicating an MIMO application method when MIMO is applied to the enhanced layer.

Here, the second signaling information may be included in the L1-Detail signaling.

Here, the second signaling information may include information about whether stream-combining is applied to the physical layer pipe (PLP) corresponding to the enhanced layer, whether IQ polarization interleaving is applied to the physical layer pipe, and whether phase-hopping is applied to the physical layer pipe.

The broadcast signal generation unit 1530 generates a broadcast signal using the first signaling information and the second signaling information.

Here, the first signaling information may be generated for each subframe of the broadcast signal, and the second signaling information may be generated for each physical layer pipe (PLP) corresponding to the enhanced layer.

Here, upon receiving a broadcast signal, a first receiver, which supports only LDM, may reconstruct only a signal transferred through a core layer, and may process a signal transferred through an enhanced layer as a noise signal.

Here, a second receiver, which supports both LDM and MIMO, may reconstruct not only a signal transferred through a core layer but also a signal transferred through an enhanced layer based on the first signaling information and the second signaling information.

Using the above-described apparatus for transmitting a broadcast signal, the performance of a broadcast system to which MIMO and LDM are applied may be improved.

Also, when a signal in which LDM and MIMO are combined is transmitted and when signaling information for accessing the signal is transferred, the performance of a broadcast system may be efficiently improved, and various services may be provided.

Figure 16:
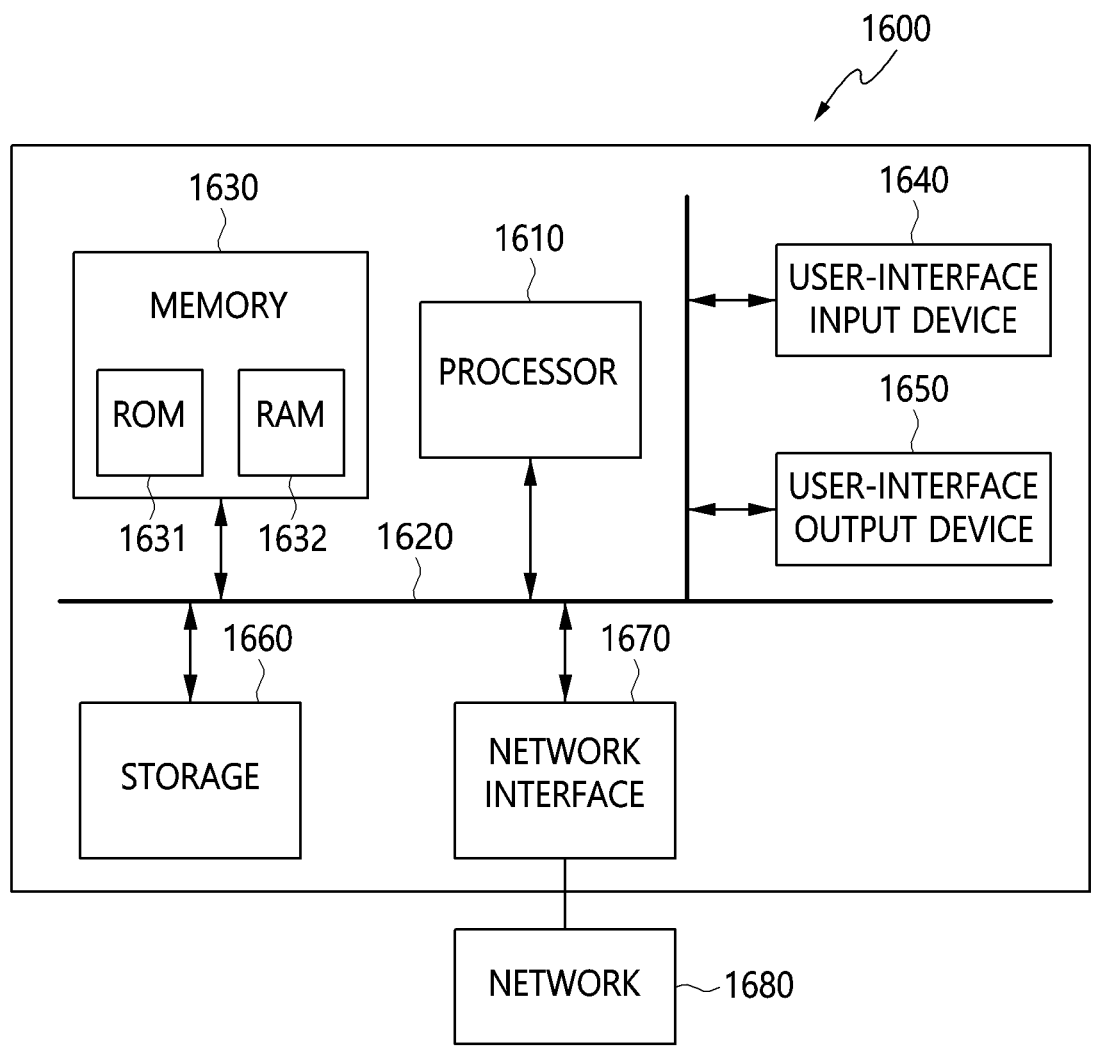
FIG. 16 is a view illustrating a computer system according to an embodiment of the present invention.

FIG. 16 is a view illustrating a computer system according to an embodiment of the present invention.

Referring to FIG. 16, an embodiment of the present invention may be implemented in a computer system including a computer-readable recording medium. As illustrated in FIG. 16, the computer system 1600 may include one or more processors 1610, memory 1630, a user-interface input device 1640, a user-interface output device 1650, and storage 1660, which communicate with each other via a bus 1620. Also, the computer system 1600 may further include a network interface 1670 connected to a network 1680. The processor 1610 may be a central processing unit or a semiconductor device for executing processing instructions stored in the memory 1630 or the storage 1660. The memory 1630 and the storage 1660 may be any of various types of volatile or nonvolatile storage media. For example, the memory may include ROM 1631 or RAM 1632.

Here, the first signaling information generation unit 1510, the second signaling information generation unit 1520, and the broadcast signal generation unit 1530 illustrated in FIG. 15 may correspond to the processor 1610 illustrated in FIG. 16.

Accordingly, an embodiment of the present invention may be implemented as a non-transitory computer-readable storage medium in which methods implemented using a computer or instructions executable in a computer are recorded. When the computer-readable instructions are executed by a processor, the computer-readable instructions may perform a method according to at least one aspect of the present invention.

According to the present invention, the performance of a broadcast system to which MIMO technology and LDM technology are applied may be improved.

Also, the present invention may efficiently improve the performance of a broadcast system and provide various services when a signal in which MIMO technology and LDM technology are combined and signaling information for accessing the signal are transmitted.

Also, the present invention may provide a broadcast service, to which a combination of MIMO technology and LDM technology is applied, while maintaining compatibility with existing receivers.

Also, the present invention may enable an existing terminal, to which combined technology is not applied, to receive a terrestrial broadcast signal including a core layer signal and to acquire transmission information in the same manner as before.

As described above, the method for transmitting a broadcast signal for signaling information about a combination of LDM and MIMO and the apparatus using the method according to the present invention are not limitedly applied to the configurations and operations of the above-described embodiments, but all or some of the embodiments may be selectively combined and configured, so that the embodiments may be modified in various ways.

What is claimed is:

1. A method for transmitting a broadcast signal, comprising:

generating, using a processor, first signaling information indicating whether Multiple-Input Multiple-Output (MIMO) technology is applied to an enhanced layer by Layered-Division Multiplexing (LDM) technology;

generating, using the processor, second signaling information indicating a MIMO application method when the MIMO technology is applied to the enhanced layer; and generating, using the processor, the broadcast signal using the first signaling information and the second signaling information.

2. The method of claim 1, wherein:

the first signaling information for a first subframe of the broadcast signal is included in L1-Basic signaling of a preamble of the broadcast signal, and the first signaling information for a current subframe subsequent to the first subframe in the broadcast signal is included in L1-Detail signaling of the preamble.

3. The method of claim 2, wherein:

the second signaling information is included in the L1-Detail signaling.

4. The method of claim 1, wherein:

the second signaling information includes information about whether a stream-combining technique is applied to a physical layer pipe (PLP) corresponding to the enhanced layer, whether an IQ polarization interleaving technique is applied to the physical layer pipe, and whether a phase-hopping technique is applied to the physical layer pipe.

5. The method of claim 2, wherein:

the first signaling information is generated for each subframe of the broadcast signal, and the second signaling information is generated for each physical layer pipe (PLP) corresponding to the enhanced layer.

6. The method of claim 1, wherein:

upon receiving the broadcast signal, a first receiver, which supports only the LDM technology, reconstructs only a signal transferred through a core layer and processes a signal transferred through the enhanced layer as a noise signal.

7. The method of claim 6, wherein:

a second receiver, which supports both the LDM technology and the MIMO technology, reconstructs not only the signal transferred through the core layer but also the signal transferred through the enhanced layer based on the first signaling information and the second signaling information.

8. A method for transmitting a broadcast signal, comprising:

generating, using a processor, first signaling information indicating whether Multiple-Input Multiple-Output (MIMO) technology is applied to an enhanced layer by Layered-Division Multiplexing (LDM) technology;

generating, using the processor, second signaling information indicating a MIMO application method when the MIMO technology is applied to the enhanced layer; and generating, using the processor, the broadcast signal using the first signaling information and the second signaling information, wherein the first signaling information is included in L1-Detail signaling of a preamble of the broadcast signal.

9. The method of claim 8, wherein:

the first signaling information is generated for each subframe of the broadcast signal, and the second signaling information is generated for each physical layer pipe (PLP) corresponding to the enhanced layer.

10. The method of claim 8, wherein:

the first signaling information and the second signaling information are generated only for a subframe to which the LDM technology is applied, among all subframes of the broadcast signal.

11. An apparatus for transmitting a broadcast signal, comprising:

a processor; and a memory storing thereon instructions, which, when executed by the processor, cause the processor to:

generate first signaling information indicating whether Multiple-Input Multiple-Output (MIMO) technology is applied to an enhanced layer by Layered-Division Multiplexing (LDM) technology;

generate second signaling information indicating a MIMO application method when the MIMO technology is applied to the enhanced layer; and generate the broadcast signal using the first signaling information and the second signaling information.

12. The apparatus of claim 11, wherein:

the first signaling information for a first subframe of the broadcast signal is included in L1-Basic signaling of a preamble of the broadcast signal, and the first signaling information for a current subframe subsequent to the first subframe in the broadcast signal is included in L1-Detail signaling of the preamble.

13. The apparatus of claim 12, wherein:

the second signaling information is included in the L1-Detail signaling.

14. The apparatus of claim 11, wherein:

the second signaling information includes information about whether a stream-combining technique is applied to a physical layer pipe (PLP) corresponding to the enhanced layer, whether an IQ polarization interleaving technique is applied to the physical layer pipe, and whether a phase-hopping technique is applied to the physical layer pipe.

15. The apparatus of claim 12, wherein:

the first signaling information is generated for each subframe of the broadcast signal, and the second signaling information is generated for each physical layer pipe (PLP) corresponding to the enhanced layer.

16. The apparatus of claim 11, wherein:

upon receiving the broadcast signal, a first receiver, which supports only the LDM technology, reconstructs only a signal transferred through a core layer and processes a signal transferred through the enhanced layer as a noise signal.

17. The apparatus of claim 16, wherein:

a second receiver, which supports both the LDM technology and the MIMO technology, reconstructs not only the signal transferred through the core layer but also the signal transferred through the enhanced layer based on the first signaling information and the second signaling information.

* * * * *